(12) United States Patent
Araki (10) Patent No.: US 12,488,194 B2
(45) Date of Patent: Dec. 2, 2025

(54) SYSTEM AND METHOD WITH ENTITY TYPE CLARIFICATION FOR FINE-GRAINED FACTUAL KNOWLEDGE RETRIEVAL

(71) Applicant: Robert Bosch GmbH, Stuttgart (DE)

(72) Inventor: Jun Araki, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 399 days.

(21) Appl. No.: 17/707,080

(22) Filed: Mar. 29, 2022

(65) Prior Publication Data

US 2023/0316001 A1    Oct. 5, 2023

(51) Int. Cl.
| | | |
|---|---|---|
| *G06F 40/40* | (2020.01) | |
| *G06F 40/295* | (2020.01) | |
| *G06F 40/35* | (2020.01) | |
| *G06N 5/02* | (2023.01) | |

(52) U.S. Cl.
CPC .......... *G06F 40/40* (2020.01); *G06F 40/295* (2020.01); *G06F 40/35* (2020.01); *G06N 5/02* (2013.01)

(58) Field of Classification Search
CPC .......... G06F 40/00; G06F 40/35; G06F 40/40; G06F 40/295; G06N 5/00; G06N 5/02
See application file for complete search history.

(56) References Cited

U.S. PATENT DOCUMENTS

| | | | | |
|---|---|---|---|---|
| 9,466,294 | B1* | 10/2016 | Tunstall-Pedoe | G10L 15/22 |
| 2018/0233141 | A1* | 8/2018 | Solomon | G06V 40/173 |
| 2020/0151607 | A1* | 5/2020 | Bishop | G06F 40/295 |
| 2022/0147835 | A1* | 5/2022 | Kuo | G06N 5/02 |
| 2022/0414129 | A1* | 12/2022 | Kurumaddali | G06F 40/40 |
| 2023/0076127 | A1* | 3/2023 | Yu | G06F 21/577 |
| 2023/0177363 | A1* | 6/2023 | Li | G06F 40/279 |
| | | | | 706/45 |
| 2023/0205824 | A1* | 6/2023 | Jablokov | G06F 16/3329 |
| | | | | 707/737 |
| 2023/0237277 | A1* | 7/2023 | Reza | G06F 40/169 |
| | | | | 704/9 |

OTHER PUBLICATIONS

De Cao, Nicola, Gautier Izacard, Sebastian Riedel, and Fabio Petroni. "Autoregressive entity retrieval." arXiv preprint arXiv:2010.00904 (2020). (Year: 2020).*

(Continued)

*Primary Examiner* — Daniel C Washburn
*Assistant Examiner* — Sean E Serraguard
(74) *Attorney, Agent, or Firm* — Kathy Takeguchi; Maginot, Moore & Beck LLP (57) ABSTRACT

A computer-implemented system and method relate to factual knowledge retrieval with entity type clarification. A set of candidates is generated for a first prompt. The set of candidates provide a solution to the first prompt. A set of second prompts is generated based on the set of candidates. A set of entity types is generated using the set of second prompts. The set of entity types categorize the set of candidates. The set of entity types is output via a user interface. A selected entity type is received via the user interface. The selected entity type is chosen from among the set of entity types. A selected candidate is output. The selected candidate corresponds to the selected entity type.

10 Claims, 4 Drawing Sheets

(56) References Cited

OTHER PUBLICATIONS

Anderson et al., Guided Open Vocabulary Image Captioning with Constrained Beam Search, Proceedings of the 2017 Conference on Empirical Methods in Natural Language Processing, Copenhagen, Denmark, Sep. 7-11, 2017, Association for Computational Linguistics, pp. 936-945.
Araki et al., Open-Domain Event Detection using Distant Supervision, Proceedings of the 27th International Conference on Computational Linguistics, Santa Fe, New Mexico, USA, Association for Computational Linguistics, Aug. 20-26, 2018, pp. 878-891.
Brown et al., Language Models are Few-Shot Learners, Proceedings of Advances in Neural Information Processing Systems, 2020, pp. 1877-1901.
Cao et al., Knowledgeable or Educated Guess? Revisiting Language Models as Knowledge Bases, Proceedings of the 59th Annual Meeting of the Association for Computational Linguistics and the 11th International Joint Conference on Natural Language Processing (vol. 1: Long Papers), Association for Computational Linguistics, 2021, pp. 1860-1874.
Dathathri et al., Plug and Play Language Models: A Simple Approach to Controlled Text Generation, Proceedings of the International Conference on Learning Representations, 2020, pp. 1-34.
Devlin et al., BERT: Pre-training of Deep Bidirectional Transformers for Language Understanding, Proceedings of the 2019 Conference of the North American Chapter of the Association for Computational Linguistics: Human Language Technologies, vol. 1 (Long and Short Papers), Association for Computational Linguistics, Minneapolis, Minnesota, Jun. 2-Jun. 7, 2019, pp. 4171-4186.
Ficler et al., Controlling Linguistic Style Aspects in Neural Language Generation, Proceedings of the Workshop on Stylistic Variation, Copenhagen, Denmark, Association for Computational Linguistics, Sep. 7-11, 2017, pp. 94-104.
Haviv et al., BERTese: Learning to speak to BERT, Proceedings of the 16th Conference of the European Chapter of the Association for Computational Linguistics, Online, Association for Computational Linguistics, Apr. 19-23, 2021, pp. 3618-3623.
Hokamp et al., Lexically Constrained Decoding for Sequence Generation Using Grid Beam Search, Proceedings of the 55th Annual Meeting of the Association for Computational Linguistics (vol. 1: Long Papers), Vancouver, Canada, Jul. 30-Aug. 4, 2017, Association for Computational Linguistics, pp. 1535-1546.
Hu et al., Improved Lexically Constrained Decoding for Translation and Monolingual Rewriting, Proceedings of the 2019 Conference of the North American Chapter of the Association for Computational Linguistics: Human Language Technologies, vol. 1, 2019, Minneapolis, Minnesota, pp. 839-850.
Jiang et al., X-FACTR: Multilingual Factual Knowledge Retrieval from Pretrained Language Models, Proceedings of the 2020 Conference on Empirical Methods in Natural Language Processing (EMNLP), Nov. 16-20, 2020, Association for Computational Linguistics, pp. 5943-5959.
Jiang et al., How Can We Know What Language Models Know?, Transactions of the Association for Computational Linguistics, vol. 8, 2020, pp. 423-438.
Keskar et al., CTRL: A Conditional Transformer Language Model for Controllable Generation, arXiv:1909.05858v2, Sep. 20, 2019, pp. 1-18.
Kikuchi et al., Controlling Output Length in Neural Encoder-Decoders, Proceedings of the 2016 Conference on Empirical Methods in Natural Language Processing, Austin, Texas, Nov. 1-5, 2016, pp. 1328-1338.
Liu et al., Pre-train, Prompt, and Predict: A Systematic Survey of Prompting Methods in Natural Language Processing, arXiv:2107.13586v1, Jul. 28, 2021, pp. 1-46.
Liu et al., GPT Understands, Too, arXiv:2103.10385v1, Mar. 18, 2021, pp. 1-10.
Lu et al., NeuroLogic Decoding: (Un)supervised Neural Text Generation with Predicate Logic Constraints, Proceedings of the 2021 Conference of the North American Chapter of the Association for Computational Linguistics: Human Language Technologies, Association for Computational Linguistics, Jun. 6-11, 2021, pp. 4288-4299.
Miao et al., CGMH: Constrained Sentence Generation by Metropolis-Hastings Sampling, Proceedings of the Thirty-Third AAAI Conference on Artificial Intelligence (AAAI-19), Association for the Advancement of Artificial Intelligence, 2019, pp. 6834-6842.
Pascual et al., Directed Beam Search: Plug-and-Play Lexically Constrained Language Generation arXiv:2012.15416v1, Dec. 31, 2020, pp. 1-9.
Perez et al., True Few-Shot Learning with Language Models, arXiv:2105.11447v1, May 24, 2021, pp. 1-21.
Petroni et al., How Context Affects Language Models' Factual Predictions, Proceedings of the Conference on Automated Knowledge Base Construction, 2020, pp. 1-15.
Petroni et al., Language Models as knowledge bases?, Proceedings of the 2019 Conference on Empirical Methods in Natural Language Processing and the 9th International Joint Conference on Natural Language Processing, Hong Kong, China, Nov. 3-7, 2019, Association for Computational Linguistics, pp. 2463-2473.
Post et al., Fast Lexically Constrained Decoding with Dynamic Beam Allocation for Neural Machine Translation, Proceedings of the Conference of the North American Chapter of the Association for Computational Linguistics: Human Language Technologies, 2018, vol. 1, New Orleans, Louisiana, pp. 1314-1324.
Qin et al., Learning How to Ask: Querying LMs with Mixtures of Soft Prompts, Proceedings of the Conference of the North American Chapter of the Association for Computational Linguistics: Human Language Technologies, 2021, Association for Computational Linguistics, pp. 5203-5212.
Salazar et al., Masked Language Model Scoring, Proceedings of the 58th Annual Meeting of the Association for Computational Linguistics, 2020, Association for Computational Linguistics, pp. 2699-2712.
Sha, Gradient-guided Unsupervised Lexically Constrained Text Generation, Proceedings of the 2020 Conference on Empirical Methods in Natural Language Processing (EMNLP), Nov. 16-20, 2020, Association for Computational Linguistics, pp. 8692-8703.
Shin et al., Autoprompt: Eliciting Knowledge from Language Models with Automatically Generated Prompts, Proceedings of the 2020 Conference on Empirical Methods in Natural Language Processing (EMNLP), 2020, Association for Computational Linguistics, pp. 4222-4235.
Vaswani et al., Attention is All You Need, Advances in Neural Information Processing Systems, 31st Conference on Neural Information Processing Systems (NIPS 2017), Long Beach, CA, USA, pp. 1-11.
Yu et al., SeqGAN: Sequence Generative Adversarial Nets with Policy Gradient, Proceedings of the Thirty-First AAAI Conference on Artificial Intelligence, 2017, Association for the Advancement of Artificial Intelligence, pp. 2852-2858.
Zhong et al., Factual Probing is [MASK]: Learning vs. Learning to Recall, Proceedings of the 2021 Conference of the North American Chapter of the Association for Computational Linguistics: Human Language Technologies, 2021, Association for Computational Linguistics, pp. 5017-5033.
Ziegler et al., Fine-Tuning Language Models from Human Preferences, arXiv:1909.08593v2, Jan. 8, 2020, pp. 1-26.

\* cited by examiner

SYSTEM AND METHOD WITH ENTITY TYPE CLARIFICATION FOR FINE-GRAINED FACTUAL KNOWLEDGE RETRIEVAL

FIELD

This disclosure relates generally to computer-implemented systems and methods involving natural language processing (NLP) and factual knowledge acquisition.

BACKGROUND

In general, factual knowledge acquisition involves obtaining factual knowledge described in source texts written in natural language. The obtained factual knowledge is often stored in knowledge bases, where knowledge is normally encoded as a collection of relational triples (subject, relation, object). These knowledge bases may be utilized by downstream applications, such as question answering systems. Traditionally, researchers have addressed the task of factual knowledge acquisition by developing supervised learning models that can extract entities and relations between them from text. For instance, given an input sentence of "Joe Biden is the president of the United States," then such a supervised learning model can extract the first entity of "Joe Biden," the second entity of "the United States," and the relation of "president-of" to form a triple of "(Joe Biden, president-of, the United States)". However, these supervised learning models normally require a large amount of human-annotated training data, which is often time-consuming and expensive to obtain in practice, especially for domain-specific applications.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method relates to factual knowledge retrieval with entity type clarification. The method includes obtaining a first prompt. The method includes generating, via a machine learning system, a set of candidates based on the first prompt, the set of candidates being answers to the first prompt. The method includes generating a set of second prompts that are based on the set of candidates. The method includes generating a set of entity types using the set of second prompts. The set of entity types categorizes the set of candidates. The method includes outputting, via a user interface, the set of entity types. The method includes receiving, via the user interface, a selected entity type that is chosen from among the set of entity types. The method includes outputting a selected candidate that corresponds to the selected entity type.

According to at least one aspect, a computer system includes a user interface, a non-transitory computer readable medium, and a processor. The non-transitory computer readable medium stores computer readable data including instructions that, when executed, perform a method. The processor is in data communication with the user interface and the non-transitory computer readable medium. The processor is configured to execute the computer readable data to perform the method. The method includes obtaining a first prompt. The method includes generating, via a machine learning system, a set of candidates based on the first prompt. The set of candidates are answers to the first prompt. The method includes generating a set of second prompts that are based on the set of candidates. The method includes generating a set of entity types using the set of second prompts. The set of entity types categorize the set of candidates. The method includes outputting, via the user interface, the set of entity types. The method includes receiving, via the user interface, a selected entity type that is chosen from among the set of entity types. The method includes outputting a selected candidate that corresponds to the selected entity type.

According to at least one aspect, one or more non-transitory computer readable storage media stores computer readable data with instructions that when executed by one or more processors cause the one or more processors to perform a method. The method includes obtaining a first prompt. The method includes generating, via a machine learning system, a set of candidates based on the first prompt. The set of candidates are answers to the first prompt. The method includes generating a set of second prompts that are based on the set of candidates. The method includes generating a set of entity types using the set of second prompts. The set of entity types categorize the set of candidates. The method includes outputting, via a user interface, the set of entity types. The method includes receiving, via the user interface, a selected entity type that is chosen from among the set of entity types. The method includes outputting a selected candidate that corresponds to the selected entity type.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
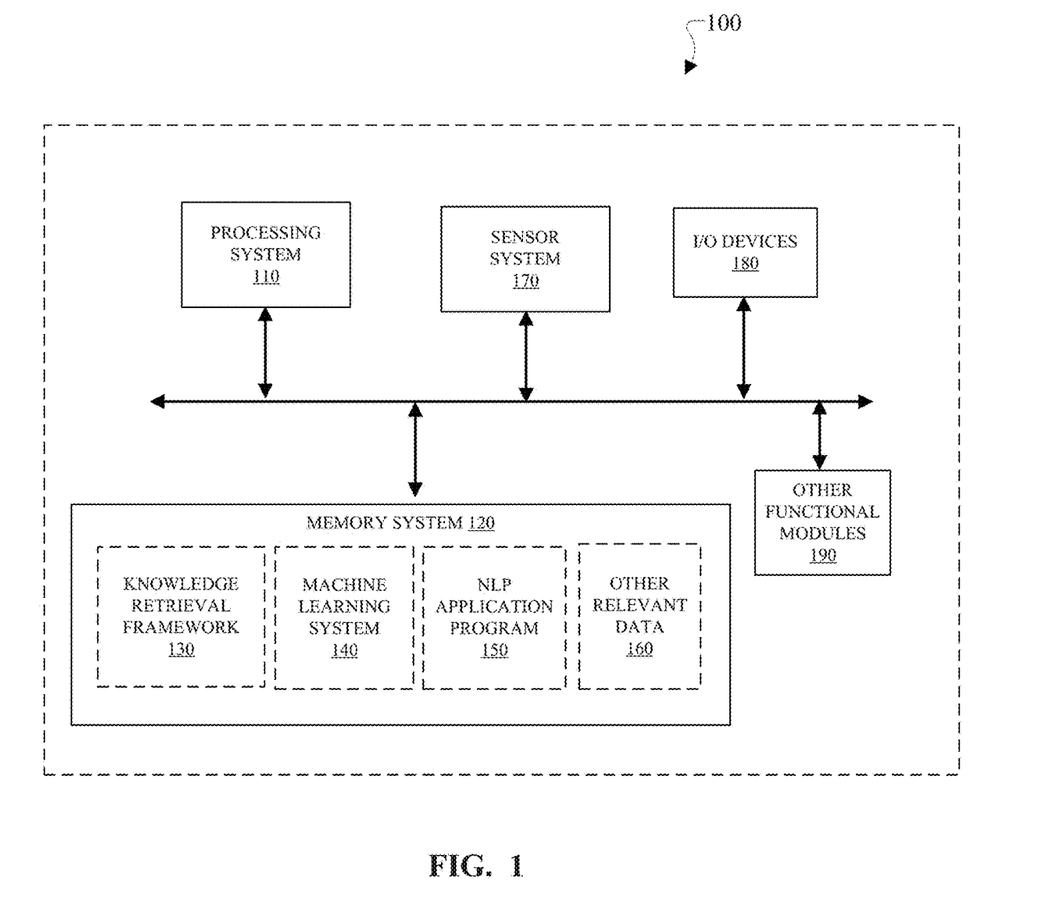
FIG. 1 is a block diagram of an example of a system relating to knowledge retrieval with entity type clarification according to an example embodiment of this disclosure.

FIG. 1 is a diagram of a system 100 that relates to NLP and factual knowledge acquisition according to an example embodiment. More specifically, the system 100 relates to factual knowledge retrieval with entity type clarification according to an example embodiment. The system 100 provides an effective process that allows users to clarify types of target entities for knowledge acquisition in an unsupervised manner. In this regard, the system 100 is configured to employ one or more machine learning systems (e.g., language models) as a basis for performing knowledge retrieval. In addition, the system 100 is configured to provide technical solutions to issues, such as prompt ambiguity and entity granularity, which stem from theoretical limitations of language-oriented concept specification.

The system 100 includes a knowledge retrieval framework 130 that is configured to generate target entities, which are desirable to users through interactive clarifications of target entity types such that there are no issues relating to prompt ambiguity and entity granularity. In an example embodiment, the knowledge retrieval framework 130 relates to factual knowledge retrieval in business intelligence use cases, but in principle, the knowledge retrieval framework 130 is adaptable to any domain or any natural language because of the unsupervised nature of the one or more machine learning systems (e.g., the one or more pre-trained language models).

The system 100 includes at least a processing system 110 with at least one processing device. For example, the processing system 110 includes at least an electronic processor, a central processing unit (CPU), a graphics processing unit (GPU), a microprocessor, a field-programmable gate array (FPGA), an application-specific integrated circuit (ASIC), any suitable processing technology, or any number and combination thereof. The processing system 110 is operable to provide the functionality as described herein.

The system 100 includes a memory system 120, which is operatively connected to the processing system 110. The processing system 110 is in data communication with the memory system 120. In an example embodiment, the memory system 120 includes at least one non-transitory computer readable storage medium, which is configured to store and provide access to various data to enable at least the processing system 110 to perform the operations and functionality, as disclosed herein. In an example embodiment, the memory system 120 comprises a single memory device or a plurality of memory devices. The memory system 120 may include electrical, electronic, magnetic, optical, semiconductor, electromagnetic, or any suitable storage technology that is operable with the system 100. For instance, in an example embodiment, the memory system 120 can include random access memory (RAM), read only memory (ROM), flash memory, a disk drive, a memory card, an optical storage device, a magnetic storage device, a memory module, any suitable type of memory device, or any number and combination thereof. With respect to the processing system 110 and/or other components of the system 100, the memory system 120 is local, remote, or a combination thereof (e.g., partly local and partly remote). For instance, in an example embodiment, the memory system 120 includes at least a cloud-based storage system (e.g. cloud-based database system), which is remote from the processing system 110 and/or other components of the system 100.

Figure 2:
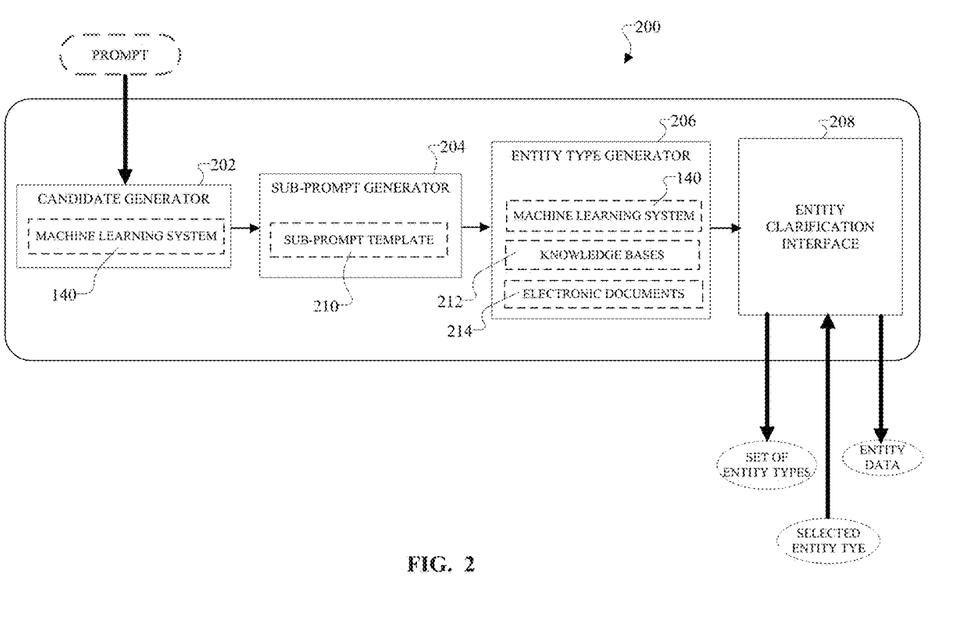
FIG. 2 is a conceptual diagram of an example of a knowledge retrieval framework with a knowledge retrieval entity type clarification system according to an example embodiment of this disclosure.

The memory system 120 includes at least the knowledge retrieval framework 130, the machine learning system 140, an NLP application program 150, and other relevant data 160, which are stored thereon. The knowledge retrieval framework 130 includes computer readable data with instructions, which, when executed by the processing system 110, is configured to retrieve factual knowledge, which is generated by the machine learning system 140 and/or stored in the memory system 120. The computer readable data can include instructions, code, routines, various related data, any software technology, or any number and combination thereof. In an example embodiment, as shown in FIG. 2, the knowledge retrieval framework 130 includes a number of software components, such as a candidate generator 202, a sub-prompt generator 204, an entity type generator 206, and entity clarification interface 208. In this regard, the term, "software component," may refer to a software-based system, subsystem, or process, which is programmed to perform one or more specific functions. A software component may include one or more software modules or software engines, which are stored in the memory system 120 at one or more locations. In some case, the software component may include or involve one or more hardware components. The knowledge retrieval framework 130 is not limited to these software components, but may include more or less software components provided that the knowledge retrieval framework 130 is configured to provide the functions as described in this disclosure.

In an example embodiment, the machine learning system 140 includes at least one pre-trained language model, any suitable artificial neural network model, or any number and combination thereof. For instance, as a non-limiting example, the pre-trained language model may include BERT, GPT-3, any suitable autoregressive language model, or any number and combination thereof. The NLP application program 150 includes computer readable data with instructions, which, when executed by the processing system 110, is configured to use and apply various data including the output data of the knowledge retrieval framework 130 in an application relating to natural language processing. In this regard, the computer readable data can include instructions, code, routines, various related data, any software technology, or any number and combination thereof. As a non-limiting example, the NLP application program 150 is configured to aid in the construction of knowledge graphs and knowledge bases using the output data of the knowledge retrieval framework 130. As another non-limiting example, the NLP application program 150 includes a question-answering system that uses the output data of the knowledge retrieval framework 130. The question-answering system may further be applied, for instance, in virtual assistants or any suitable computer application. Meanwhile, the other relevant data 160 provides various data (e.g. operating system, machine learning algorithms, various machine learning data, various loss data, various parameter data, various template data, various data structures, knowledge graphs, knowledge bases, etc.), which enables the system 100 to perform the functions as discussed herein.

The system 100 is configured to include at least one sensor system 170. The sensor system 170 includes one or more sensors. For example, the sensor system 170 includes an image sensor, a camera, an audio sensor, any suitable sensor, or any number and combination thereof. The sensor system 170 is operable to communicate with one or more other components (e.g., processing system 110 and memory system 120) of the system 100. For example, the sensor system 170 may provide sensor data (e.g., audio data, image data, etc.), which is then used or pre-processed by the processing system 110 to generate suitable input data (e.g., text data) for the machine learning system 140 (e.g., language model). In this regard, the processing system 110 is configured to obtain the sensor data directly or indirectly from one or more sensors of the sensor system 170. The sensor system 170 is local, remote, or a combination thereof (e.g., partly local and partly remote). Upon receiving the sensor data, the processing system 110 is configured to process this sensor data and provide the sensor data in a suitable format (e.g., a text string) in connection with the knowledge retrieval framework 130, the machine learning system 140, the NLP application program 150, or any number and combination thereof.

In addition, the system 100 may include at least one other component. For example, as shown in FIG. 1, the memory system 120 is also configured to store other relevant data 160, which relates to operation of the system 100 in relation to one or more components (e.g., sensor system 170, input/output (I/O) devices 180, and other functional modules 190). In addition, the system 100 is configured to include one or more I/O devices 180 (e.g., display device, touchscreen device, keyboard device, microphone device, speaker device, etc.), which relate to the system 100. Also, the system 100 includes other functional modules 190, such as any appropriate hardware, software, or combination thereof that assist with or contribute to the functioning of the system 100. For example, the other functional modules 190 include communication technology that enables components of the system 100 to communicate with each other as described in this disclosure. In this regard, the system 100 is operable to perform the knowledge retrieval framework 130, as well as train, employ, and/or deploy the machine learning system 140.

Figure 3:
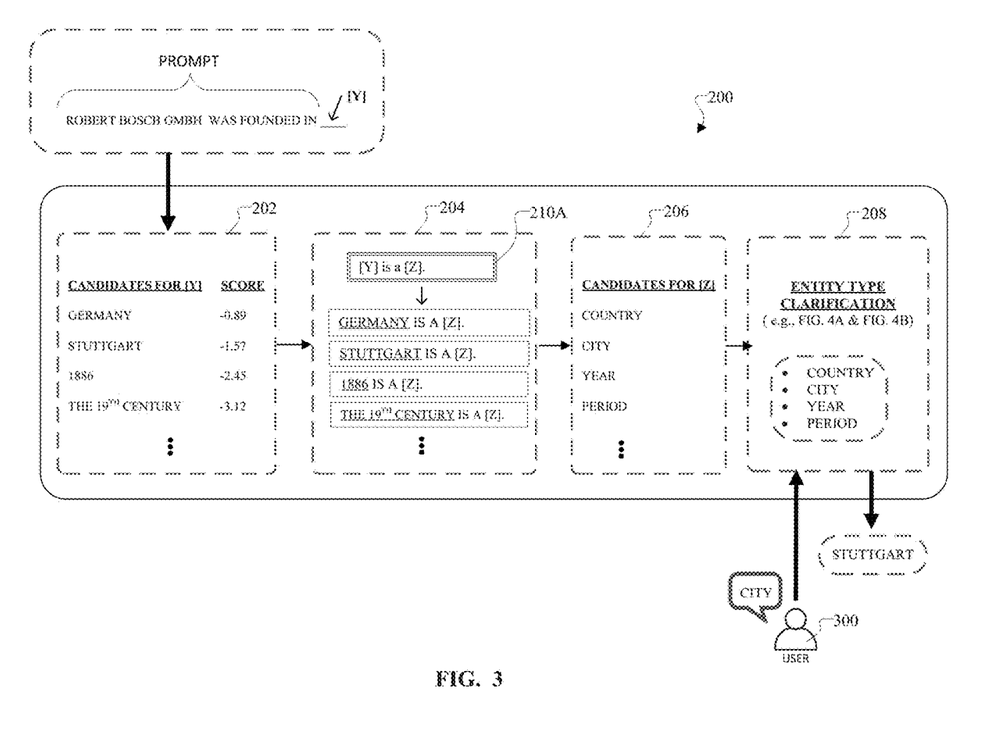
FIG. 3 is a conceptual diagram of a non-limiting example of data instances of the knowledge retrieval entity type clarification system according to an example embodiment of this disclosure.

FIG. 2 and FIG. 3 illustrate diagrams of an example a knowledge retrieval entity type clarification (KRETC) system 200 according to an example embodiment. In an example embodiment, the knowledge retrieval framework 130 (FIG. 1) includes the KRETC system 200. More specifically, FIG. 2 shows a block diagram of the KRETC system 200 while FIG. 3 shows non-limiting examples of various data instances as the KRETC system 200 generates output data (e.g. entity data such as "Stuttgart") upon receiving input data (e.g., a prompt such as "Robert Bosch GmbH was founded in_"). In general, the KRETC system 200 is configured to generate a target entity of a desired scope based on an interactive interface requesting clarification regarding a desired entity type. The KRETC system 200 is performed by one or more processors of the processing system 110 (FIG. 1). In the example shown in FIG. 2, the KRETC system 200 includes the candidate generator 202, the sub-prompt generator 204, the entity type generator 206, and the entity clarification interface 208. As aforementioned, the KRETC system 200 may include more or less software components than the number of software components shown in FIG. 2 provided that the KRETC system 200 is configured to provide the functions as described in this disclosure.

In FIG. 2, the processing system 110 is configured to provide the KRETC system 200 with a text string as input data. For example, in FIG. 3, the KRETC system 200 is configured to provide a prompt (e.g., "Robert Bosch GmbH was founded in") as the input data. The prompt may be generated automatically by the processing system 110 or manually by a user. As one example, for instance, the prompt may be generated by the processing system 110 via a template with two distinct slots: an input slot [X] and an answer slot [Y]. More specifically, in FIG. 3, as a non-limiting example, the prompt was generated using a template (e.g., $x_{template}$="[X] was founded in [Y]."). In this example, the prompt is generated when the input slot [X] is filled with an input entity $x_{entity}$ (e.g., "Robert Bosch GmbH") such that the $x_{template}$ is instantiated into $x_{prompt}$="Robert Bosch GmbH was founded in [Y]." FIG. 3 provides an example of a prompt that may be obtained as input data by the KRETC system 200. The KRETC system 200 is configured to receive and/or generate other types of prompts, which include other relations that are different from the relation (e.g., "was founded in") of the example in FIG. 3 provided that these other prompts include input entities that elicit target entities.

In an example embodiment, the candidate generator 202 includes the machine learning system 140, which is configured to receive the prompt as input. More specifically, in this example, the machine learning system 140 includes an autoregressive language model, which is pre-trained. The language model is configured to predict a next word (e.g., target entity) based on the previous context (e.g., the prompt), thereby modeling natural language (e.g., English). For example, as shown in FIG. 3, upon receiving a prompt as input, the machine learning system 140 is configured to perform factual knowledge retrieval by predicting the answer slot [Y], given an input prompt $x_{prompt}$. In this regard, the KRETC system 200 is considered to have the factual knowledge queried by $x_{prompt}$ if the final output 9 produced by the machine learning system 140 (e.g., the language model) is the same as the ground truth y. In addition to predicting one or more target entities [Y] for the prompt, the candidate generator 202 (e.g., the machine learning system 140) is configured to generate one or more confidence scores that correspond to the one or more target entities [Y].

The machine learning system 140 (e.g., pre-trained language model) may find the correct answer "y" by memorizing the facts under the language modeling objective during the pre-training phase. The correct answer may be a single token or a multi-token phrase. To deal with multi-token answers, the machine learning system 140 may employ a multi-token decoding method. Specifically, the machine learning system 140 may convert [Y] to a sequence of mask tokens "[MASK] ... [MASK]" and choose the final prediction based on the confidence by enumerating from 1 to M mask tokens in [Y], where M is the maximum number of mask tokens allowed for the answer slot. For example, as expressed in equation 1, the confidence score may be denoted as c(m) for "m" mask tokens. To compute the confidence, the machine learning system 140 uses a pseudo-log-likelihood score, which is the sum of log probabilities of each predicted token conditioned on the other tokens:

$$c(m) = \Sigma_{i=1}^{m} \log P_{LM}(y'_i | x_{prompt}, y'_{<i}) \qquad [1]$$

where $P_{LM}$ is the probability of the language model predicting the i-th token $y'_i$. The exact decoding is intractable due to the large size of vocabulary. Thus, the machine learning system 140 may employ a beam search to keep track of the most plausible "B" predictions in the confidence computation, where "B" represents a beam size. Among a collection of these predictions, the candidate generator 202 is configured to select a set of candidates with final predictions having a predetermined number of predictions with the highest confidence scores, as calculated via equation 2.

$$\hat{y} = \underset{y'=y'_1 \ldots y'_{\hat{m}}}{\operatorname{argmax}} \sum_{i=1}^{\hat{m}} \log P_{LM}(y'_i | x_{prompt}, y'_{<i}) \text{ where} \quad [2]$$

$$\hat{m} = \underset{1 \le m \le M}{\operatorname{argmax}} c(m).$$

As non-limiting examples, FIG. 3 shows some candidates, which are generated by the machine learning system 140 in response to the input prompt of "Robert Bosch GmbH was founded in [Y]." In this example, the machine learning system 140 is configured to generate output that includes at least four answer candidates ("Germany", "Stuttgart", "1886", and "the 19th century") along with their corresponding confidence scores (−0.89, −1.57, −2.45, and −3.12). In this non-limiting example, the answer candidate of "Germany" is considered to have the highest confidence (−0.89) while the answer candidate of "the $19^{th}$ century" is considered to have the lowest confidence (−3.12) among the four answer candidates shown in FIG. 3. In this regard, the candidate generator 202 is configured to perform the confidence computation and select a set of candidates for the prompt (e.g., "Robert Bosch GmbH was founded in [Y]," where [Y] is the answer slot of the prompt). As shown in FIG. 3, the set of candidates includes four answer candidates, which are selected from a collection of answer candidates that are generated by the machine learning system 140. The candidate generator 202 may select the set of candidates based on a predetermined number of candidates less than or equal to the beam size with the highest confidence scores. The candidate generator 202 may select a candidate to be in the set of candidates if that candidate has a confidence score that is above a threshold value and/or if that candidate satisfies other threshold criteria. The set of candidates may include any suitable number of candidates.

Next, the KRETC system 200 is configured to perform a sub-task of entity type induction. For example, in FIG. 3, the goal of this sub-task is to predict the most fine-grained entity type for a given entity. For entity type induction, the sub-prompt generator 204 applies a pre-defined template 210. For instance, in FIG. 3, the sub-prompt generator 204 includes a sub-prompt template 210A, which is defined as $z_{template}$=[Y] is a [Z] and applied to each of the answer candidates. More specifically, the sub-prompt generator 204 fills the input slot [Y] with an answer candidate to create each sub-prompt, where [Z] represents the output slot (or the type slot) that contains the entity type. The KRETC system 200 is not limited to using $z_{template}$=[Y] is a [Z] as the sub-prompt template. In this regard, for example, the KRETC system 200 may include one or more other sub-templates (e.g., $z_{template}$=[Y] are [Z]) provided that the KRETC system 200 is configured to use one or more these other sub-templates to generate prompts that induce the entity type generator 206 to generate entity types to resolve ambiguity and granularity issues.

Referring to FIG. 3, for instance, with respect to the answer candidate of "Germany," the sub-prompt generator 204 creates a prompt of "Germany is a [Z]." With respect to the answer candidate of "Stuttgart," the sub-prompt generator 204 creates a prompt of "Stuttgart is a [Z]." With respect to the answer candidate of "1886," the sub-prompt generator 204 creates a prompt of "1886 is a [Z]." With respect to the answer candidate of "the $19^{th}$ century," the sub-prompt generator 204 creates a prompt of "The 19th century is a [Z]." In this regard, each of these prompts is a prompt, but may be referred to as a "sub-prompt" for being associated with the sub-task of entity clarification, which is under the primary task of factual knowledge retrieval.

Upon generating each sub-prompt for each answer candidate within the set of candidates, the entity type generator 206 is configured perform factual knowledge retrieval on each sub-prompt to obtain the entity types of the answer candidates. The KRETC system 200 is configured to obtain the most fine-grained entity types because they are the most likely to be described in a specific way in pre-training corpora. For example, when pre-training, with respect to "Germany" and "Stuttgart," the pre-training corpora is likely to state that "Germany is a country . . . " and "Stuttgart is a city . . . ," respectively.

Referring to FIG. 3, for instance, the KRETC system 200 is configured to leverage the machine learning system 140 (e.g. at least one autoregressive language model) to address the sub-task of entity type induction in an unsupervised manner similarly to the primary task of factual knowledge retrieval to obtain the set of answer candidates. The entity type generator 206 may employ the same autoregressive language model as the candidate generator 202 or another machine learning model. More specifically, for example, the entity type generator 206 is configured to employ the machine learning system 140 to generate a collection of entity types and a corresponding collection of confidence scores as output upon receiving a sub-prompt as input. For example, the machine learning system 140 generates a collection of entity types and a corresponding collection of confidence scores based on the sub-prompt of "Germany is a [Z]." The machine learning system 140 generates a collection of entity types and a corresponding collection of confidence scores based on the sub-prompt of "Stuttgart is a [Z]." In addition, the machine learning system 140 generates a collection of entity types and a corresponding collection of confidence scores based on the sub-prompt of "1886 is a [Z]." Also, the machine learning system 140 generates a collection of entity types and a corresponding collection of confidence scores based on the sub-prompt of "The $19^{th}$ century is a [Z]."

In addition, the entity type generator 206 is configured to select an entity type with the highest confidence score from each collection of entity types. In this regard, the entity type generator 206 selects "country" to represent the entity type for the sub-prompt with the answer candidate of "Germany" because "country" has the greatest confidence score. The entity type generator 206 selects "city" to represent the entity type for the sub-prompt with the answer candidate of "Stuttgart" because "city" has the greatest confidence score. In addition, the entity type generator 206 selects "year" to represent the entity type for the sub-prompt with the answer candidate of "1886" because "year" has the greatest confidence score. Also, the entity type generator 206 selects "period" to represent the entity type for the sub-prompt with the answer candidate of "the $19^{th}$ century" because "period" has the greatest confidence score. In this regard, the entity type generator 206 is configured to select an entity type that best represents the corresponding entity data (i.e., the answer candidate) as described above or by any suitable means. Afterwards, the entity type generator 206 generates a set of entity types (e.g., country, city, year and period) that best represents the set of candidates (e.g., Germany, Stuttgart, 1886, and the $19^{th}$ century), as shown in FIG. 3.

Additionally or alternatively to using the machine learning system 140, the entity type generator 206 is configured to employ one or more other methods to support entity type induction in some cases. As an example, the entity type generator 206 is configured to employ at least one in-domain knowledge base 212 provided that the answer candidates are encoded with their entity type in the knowledge base. Additionally or alternatively, as another example, the entity type generator 206 is configured to leverage a heuristics-based process to extract high-level concepts of target entities from first sentences in one or more electronic documents 214, such as a corpus of Wikipedia articles. Such heuristic-based processes are beneficial when an electronic source (e.g., Wikipedia) includes documents or articles with answer candidates and entity types. After the entity type induction process, the KRETC system 200 is configured to collect a unique set of target entity types and present this unique set of target entity types for selection.

The entity clarification interface 208 is configured to receive the set of entity types (or the unique set of target entity types) from the entity type generator 206. The entity clarification interface 208 is configured to provide interactive entity type clarification. In this regard, for example, the entity clarification interface 208 is configured to provide an interactive interface (e.g., user interface 400 of FIG. 4A, user interface 408 of FIG. 4B, and/or the any suitable user interface) such that the user 300 may choose the desired entity type of the entity data that is to be delivered as output data via an I/O device 180, the knowledge retrieval framework 130, and/or at least one downstream application (e.g., NLP application program 150). More specifically, for example, the unique set of target entity types may be displayed to a user in a user interface 400 (FIG. 4A) or any other suitable means (e.g., I/O technology) by which the user may select an entity type among the set of entity types. For instance, in FIG. 3, the entity clarification interface 208 receives a single entity type (e.g., city) from the user 300 as the selected entity type. Upon receiving the selected entity type (e.g., city) from among the set of entity types via the user interface 400, the entity clarification interface 208 is configured to locate the answer candidate that corresponds to the selected entity type and deliver that answer candidate (e.g., "Stuttgart") as output data, for example, to the user interface 408, the memory system 120, the NLP application program 150, or any number and combination thereof.

As shown in FIG. 3, the machine learning system 200 is configured to generate a number of valid answer candidates for the prompt (e.g., "Robert Bosch GmbH was founded in ______"). In this regard, the entity clarification interface 208 is advantageous in enabling a user 300 to select from among a set of answer candidates via selecting a desired entity type. This entity type selection is advantageous as the answer candidate with the highest confidence score may not provide the user with the desired entity data of the desired scope. For instance, in FIG. 3, the confidence score associated with "Stuttgart" is less than the confidence score associated with "Germany." However, as shown in FIG. 3, the user 300 desires "Stuttgart" for the entity data in relation to the prompt (e.g., "Robert Bosch GmbH was founded in ______") instead of "Germany," as the user 300 desires entity data of a different level of granularity. With the entity type clarification interface 208, the KRETC system 200 allows a user to resolve any ambiguity issues (e.g., location versus time) and/or granularity issues (e.g., country versus city) before the output data (e.g., entity data such as "Stuttgart") is output by the KRETC system 200.

In addition, the KRETC system 200 and/or the knowledge retrieval framework 130 is configured to store the entity data in association with the prompt in the memory system 120. In addition, depending upon the application, the knowledge retrieval framework 130 (and/or the NLP application program 150) is configured to provide additional processing of the prompt (e.g., "Robert Bosch GmbH was founded in ______") and the entity data (e.g., "Stuttgart"). For instance, in an example embodiment, the knowledge retrieval framework 130 and the KRETC system 200 may be used by the user 300 (e.g. a knowledge engineer) to generate knowledge graphs for knowledge bases. In this case, the knowledge retrieval framework 130 and/or the NLP application program 150 are further configured to extract the necessary data from the input data (e.g., prompt) and the corresponding output data (e.g., entity data) to generate a data structure, such as a semantic triple, based on that extracted data. For instance, in FIG. 3, the knowledge retrieval framework 130 and/or the NLP application program 150 extracts the first entity (e.g., input entity of "Robert Bosch GmbH") from the prompt, the relation (e.g., relation of "was founded in") from the prompt, and the second entity (e.g., output entity of "Stuttgart") from the output data. Upon extracting this data, the knowledge retrieval framework 130 and/or the NLP application program 150 generates a semantic triple based on the extracted data. The semantic triple includes a set of three entities and codifies a statement about semantic data in the form of subject-predicate-object expressions. In addition, the knowledge retrieval framework 130 and/or the NLP application program 150 stores this semantic triple in the memory system 120 so that another downstream application (e.g., question-answering system, etc.) is configured to use and access the semantic triple.

Figure 4A:
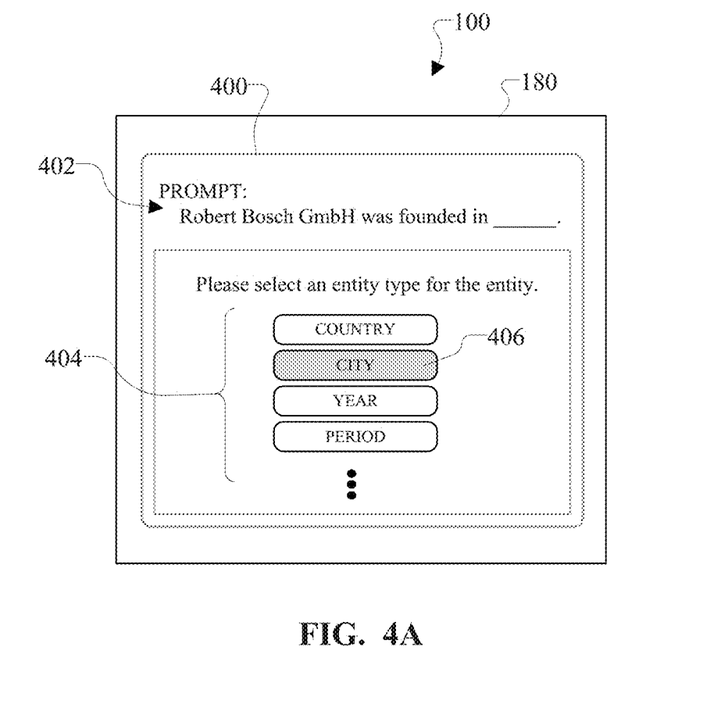
FIG. 4A is a diagram of the system with a non-limiting example of a user interface for interactive entity type clarification according to an example embodiment of this disclosure.

FIG. 4A is a diagram of a non-limiting example of a user interface 400 for interactive entity clarification according to an example embodiment. In FIG. 4A, the user interface 400 is a graphical user interface (GUI) displayed on one or more I/O devices 180 (e.g., touchscreen device, display device, etc.) of the system 100. In this non-limiting example, the user interface 400 displays the prompt 402 to serve as reference to indicate what the set of entity types is referencing. Also, in the example shown in FIG. 4A, the user interface 400 displays the set of entity types 404 as options for the user 300 to select. In this case, each entity type is a button, which is selectable upon being activated by the user 300. Alternatively, the user interface 400 may include other types of software components that present a selection of entity types as options and enable a user to select an entity type. As another non-limiting example, the user interface 400 may include a drop-down menu that provides a listing of entity types in which a particular entity type may be selected when highlighted or activated. FIG. 4A corresponds to the example shown in FIG. 3, and thus shows the entity type of "city" as being the selected entity type 406 on the user interface 400.

Figure 4B:
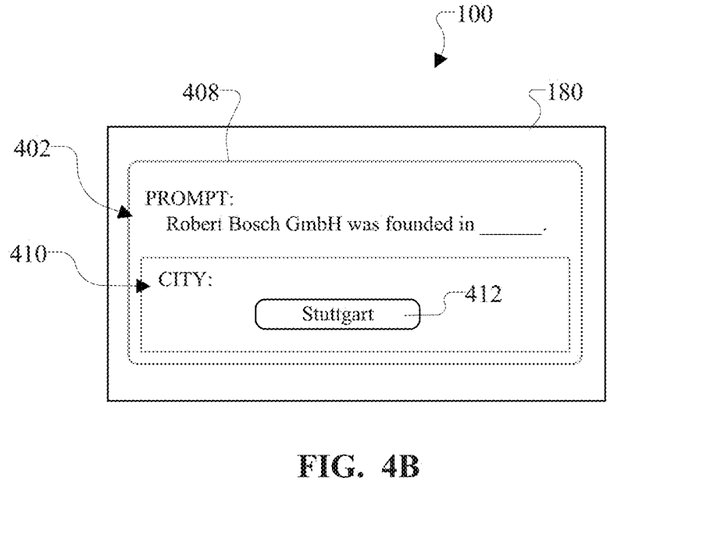
FIG. 4B is a diagram of the system with a non-limiting example of a user interface that provides the desired entity data based on interactive entity type clarification according to an example embodiment of this disclosure.

FIG. 4B is a diagram of a non-limiting example of a user interface 408 that provides the output data 410 to the user 300 according to an example embodiment. In FIG. 4B, the user interface 408 is a GUI displayed on one or more I/O devices 180 (e.g., touchscreen) of the system 100. The user interface 408 may be the same as, similar to, or different from the user interface 400. In this non-limiting example, the user interface 408 displays the prompt 402 to serve as reference to indicate what the target entity data 412 corresponding to the selected entity type 406 is referencing. Also, in the example shown in FIG. 4B, the user interface 408 displays the output data 410, which includes the desired entity data 412 (e.g., Stuttgart) corresponding to the selected entity type 406 (e.g., city). Furthermore, additionally or alternatively to displaying the entity data 412 on the I/O device 180, the KRETC system 200 is configured to store the desired entity data 412 and the corresponding prompt 402 in the memory system 120. Also, additionally or alternatively, the KRETC system 200 is configured to transmit the selected entity data 412 and the corresponding prompt 402 to the NLP application program 150 for downstream use.

As demonstrated above, FIG. 3, FIG. 4A, and FIG. 4B illustrate non-limiting examples of how the KRETC system 200 provides a technical solution to overcome issues relating to prompt ambiguity. More specifically, a natural language prompt is often ambiguous with respect to what kind of target entity is queried. For instance, in the non-limiting example shown in FIG. 4A, the target entity queried by the prompt, "Robert Bosch GmbH was founded in [Y]," may be prompting for a location where the company was founded (e.g., "Germany") or a time when the company was founded (e.g., "1886"). Due to this ambiguity issue, a single language-based prompt may be inherently incapable of specifying a type of the target entity adequately. To address this ambiguity issue, the KRETC system 200 provides an interactive approach to address prompt ambiguity such that the desired target entity is delivered to the user 300.

In addition, FIG. 3, FIG. 4A, and FIG. 4B illustrate non-limiting examples of how the KRETC system 200 provides a technical solution to overcome issues relating to entity granularity. More specifically, even if the input prompt successfully specifies a single type for the target entity without ambiguity, there may be still multiple valid candidates that are compatible with the entity type. For example, suppose hypothetically that the prompt "Robert Bosch GmbH was founded in [Y]." was unambiguous and prompted for the location of the company. Then, there are still multiple valid answer candidates that are under the location type, such as "Germany," "Stuttgart," or other suitable location data. In this case, although "Germany" has the highest confidence score, the user 300 may have already known that Robert Bosch GmbH was founded in Germany and may want to know a specific city of Germany where the company was founded. Ignoring prompt ambiguity and entity granularity, the candidate generator 202 would simply rank the answer candidates based on the word-level probabilistic estimates of the pre-trained language model. Thus, the decisive factor of their predictions is presumably how frequently the language model sees the answer candidates in contexts similar to the input prompt during the pre-training phase. However, the needs of the user 300 for knowledge acquisition can vary, depending on particular scenarios and applications. As such, without entity type clarification, there are gaps relating to ambiguity issues that, if not addressed, may result in unsatisfactory knowledge retrieval performance. Fortunately, the KRETC system 200 overcomes these ambiguity issues by enabling a user to intervene and control the entity type of the entity data (e.g., "Stuttgart") that is output for a particular prompt.

As discussed in this disclosure, the KRETC system 200 may be viewed as applying constraints to answer generation by the clarification of target entity types. In this regard, the KRETC system 200 is relevant to constrained language generation, which places certain constraints on generated sequences at inference time to achieve desirable output. In general, these constraints can be categorized into hard constraints and soft constraints. In contrast to language generation with hard constraints, which may focus on lexical constraints (e.g., including specific lexical items in the output as positive constraints or excluding lexical items from the output as negative), the KRETC system 200 puts semantic constraints on answer generation by letting users choose entity types of answers while also allowing for some flexibility in the choice of lexical items. The KRETC system 200 therefore tends to be more relevant to work on soft constraints than to work on hard constraints.

Regarding language generation with soft constraints, these approaches tend to address certain problems by retraining or fine-tuning a given language model. For example, these approaches may include fine-tuning existing models with Reinforcement Learning, training Generative Adversarial Networks, training conditional generative models, or training a large language model with control codes. Unlike the KRETC system 200, these approaches are not readily applicable to a language model because the entire language model needs to be separately fine-tuned for each specific attribute. The plug-and-play capability of making constraints readily applicable is of great importance given that current state-of-the-art language models are so large that it is unrealistic to re-train them each time. There is little work that explores readily usable soft constraints for text generation without the need for additional training. Although there is a Plug and Play Language Model (PPLM) for controllable language generation, this PPLM approach combines a pre-trained language model with one or more simple attribute classifiers that guide text generation. Their constraints are implemented as a sequence-level label for the whole generated text, such as a topic or a sentiment. In contrast, the KRETC system 200 is aimed to add type constraints to a partial (masked) span of generated text that corresponds to a target entity. The KRETC system 200 is also distinct in that the KRETC system 200 suggests possible entity types and adds the constraints through an interactive process with at least one user.

As described in this disclosure, the KRETC system 200 provides a number of advantages and benefits. For example, the KRETC system 200 provides a novel fine-grained factual knowledge retrieval framework 130, which allows users to clarify types of target entities and provides the target entities that the users want to obtain with respect to the input data. The KRETC system 200 advantageously provides an interactive knowledge retrieval process, which involves entity type clarification and which streamlines access to the target entities while enabling finer-grained knowledge retrieval based on the target entity types.

In addition, the knowledge retrieval framework 130 is effective in almost all knowledge retrieval scenarios. For example, the knowledge retrieval framework 130 with its KRETC system 200 is particularly beneficial in various cases, such as when a user is unable to construct a specific prompt that narrows downs target entities unambiguously, when there exist numerous compatible target entity candidates inherently due to the domain ontology, etc. The KRETC system 200 simplifies the clarification process by presenting possible entity types as suggestions and letting one or more users choose one or more of the most proper entity types among the suggestions.

Also, the KRETC system 200 provides both factual knowledge retrieval and entity type clarification that are highly adaptable to any domain or any natural language because of the unsupervised nature of its one or more language models. In addition, the system 100 and/or the knowledge retrieval framework 130 is configured to use unlabelled data for language model pre-training and obviate the need for human-annotated data. Thus, as compared to the traditional supervised systems that require human-annotated training data, the system 100 is able to reduce the cost of adapting the knowledge retrieval framework 130 to a domain or a language of interest.

Furthermore, the knowledge retrieval framework 130 is configured to leverage one or more language models. In general, the language model is advantageous in accepting factual knowledge queries written in natural language. For example, the language model is configured to receive a natural language prompt, such as "Joe Biden is the president of," and generate a target entity of "the United States," thereby resulting in "Joe Biden is the president of the United States." This language model approach is more advantageous than the traditional supervised approaches in terms of data-efficiency and scalability. First, this approach is more data-efficient because this approach does not require human-annotated training data for factual knowledge acquisition. As long as there is a large amount of unlabelled text available for pre-training, the language model can be trained adequately in a self-supervised manner. Second, this approach is more scalable because traditional supervised models are restricted to pre-defined schemas, but approaches based on language models are not subject to such restrictions. For example, a supervised relation extraction model trained on specific relations (e.g., 'president-of') are not readily applicable to other relations (e.g., 'CEO-of'), but approaches based on language models are immediately applicable to other relations as long as a prompt is properly formulated, e.g., "Steve Jobs is the CEO of", etc.

In addition, the knowledge retrieval framework 130 is configured to employ one or more language models, such as those with a transformer architecture that have facilitated the development of large-scale pre-trained language models such as BERT and GPT-3. In addition, these pre-trained language models tend be considered as a factual knowledge base because of its large capacity. As compared to traditional supervised approaches, pre-trained language models offer an unsupervised and schema-less solution to retrieve factual knowledge. Unlike other approaches that tend to create biased prompts that overfit a dataset, the KRETC system 200 is configured to provide answers that directly fit users' knowledge needs rather than fitting datasets by addressing the fundamental issues of prompt ambiguity and entity granularity, which often appear in real-world scenarios of knowledge acquisition.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally or alternatively, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method for a virtual assistant with factual knowledge retrieval and entity type clarification, the method comprising:
   obtaining a first prompt that includes an input entity and a relation;
   generating, via a machine learning system, a set of candidates based on the input entity and the relation of the first prompt, each candidate being a target entity that is predicted as a next word based on the input entity and the relation, the machine learning system including an autoregressive language model that is pretrained;
   generating a set of second prompts by applying a template to the set of candidates, each second prompt including a respective candidate and an entity type slot to receive an entity type of the respective candidate;
   generating, via the autoregressive language model, a set of entity types using the set of second prompts, the set of entity types categorizing the set of candidates, each entity type having a greatest confidence score with respect to satisfying the entity type slot of the respective second prompt;
   outputting, via a user interface, the set of entity types;
   receiving, via the user interface, a selected entity type that is chosen from among the set of entity types to obtain output data of a desired scope for the first prompt;
   providing an answer candidate as the output data, the answer candidate being selected from among the set of candidates based on the selected entity type;
   generating a knowledge graph that includes at least a semantic triple, the semantic triple including the input entity, the relation, and the output data; and
   using, via the virtual assistant, the semantic triple in a question-answering system.

2. The computer-implemented method of claim 1, wherein,
   the first prompt is generated based on the input entity using another template;
   the another template includes an input slot to receive the input entity;
   the another template includes an answer slot that provides a solution to the input slot;
   the machine learning system is configured to generate a first candidate as a first answer that satisfies the answer slot when the input entity is in the input slot; and
   the set of candidates includes the first candidate.

3. The computer-implemented method of claim 1, further comprising:
   generating, via the machine learning system, a set of confidence scores for the set of candidates,
   wherein,
      the answer candidate is associated with a particular confidence score,
      the set of candidates include another candidate,
      the another candidate is associated with another confidence score, and
      the particular confidence score is less than the another confidence score.

4. The computer-implemented method of claim 1, further comprising:
   updating a knowledge base with a data structure that includes the first prompt and the answer candidate,
   wherein the data structure includes a semantic triple that is stored in a non-transitory computer-readable medium.

5. A computer system for knowledge retrieval with interactive entity type clarification, the computer system comprising:
   a user interface;
   a non-transitory computer readable medium storing computer readable data including instructions that, when executed, perform a method; and
   a processor in data communication with the user interface and the non-transitory computer readable medium, the processor being configured to execute the computer readable data to perform the method that includes:
   obtaining a first prompt that includes an input entity and a relation;
   generating, via a machine learning system, a set of candidates based on the input entity and the relation of the first prompt, each candidate being a target entity that is predicted as a next word based on the input entity and the relation, the machine learning system including an autoregressive language model that is pretrained;
   generating a set of second prompts by applying a template to the set of candidates, each second prompt including a respective candidate and an entity type slot to receive an entity type of the respective candidate;
   generating, via the autoregressive language model, a set of entity types using the set of second prompts, the set of entity types categorizing the set of candidates, each entity type having a greatest confidence score with respect to satisfying the entity slot of the respective second prompt;
   outputting, via the user interface, the set of entity types;
   receiving, via the user interface, a selected entity type that is chosen from among the set of entity types to obtain output data of a desired scope for the first prompt;
   providing an answer candidate as the output data, the answer candidate being selected from among the set of candidates based on the selected entity type;
   generating a knowledge graph that includes at least a semantic triple, the semantic triple including the input entity, the relation, and the output data; and
   using, via the virtual assistant, the semantic triple in a question-answering system of the virtual assistant technology, the selected answer candidate corresponding to the selected answer entity type.

6. The computer system of claim 5,
   wherein,
   the first prompt is generated based on the input entity using another template;
   the another template includes an input slot to receive the input entity;
   the another template includes an answer slot that provides a solution to the input slot;
   the machine learning system is configured to generate a first candidate as a first answer that satisfies the answer slot when the input entity is in the input slot; and
   the set of candidates includes the first candidate.

7. The computer system of claim 5, further comprising:
   generating, via the machine learning system, a set of confidence scores for the set of candidates,
   wherein,
   the answer candidate is associated with a particular confidence score,
   the set of candidates include another candidate,
   the another candidate is associated with another confidence score, and
   the particular confidence score is less than the another confidence score.

8. The computer system of claim 5, further comprising:
   updating a knowledge base with a data structure that includes the first prompt and the selected candidate,
   wherein the data structure includes a semantic triple that is stored in the non-transitory computer readable medium.

9. One or more non-transitory computer readable storage media storing computer readable data with instructions that when executed by one or more processors cause the one or more processors to perform a method for a virtual assistant that comprises:
   obtaining a first prompt that includes an input entity and a relation;
   generating, via a machine learning system, a set of candidates based on the input entity and the relation of the first prompt, each candidate being a target entity that is predicted as a next word based on the input entity and the relation, the machine learning system including an autoregressive language model that is pretrained;
   generating a set of second prompts by applying a template to the set of candidates, each second prompt including a respective candidate and an entity type slot to receive an entity type of the respective candidate;
   generating, via the autoregressive language model, a set of entity types using the set of second prompts, the set of entity types categorizing the set of candidates each entity type having a greatest confidence score with respect to satisfying the entity slot of the respective second prompt;
   outputting, via a user interface, the set of entity types;
   receiving, via the user interface, a selected entity type that is chosen from among the set of entity types to obtain output data of a desired scope for the first prompt;
   providing an answer candidate as the output data, the answer candidate being selected from among the set of candidates based on the selected entity type;
   generating a knowledge graph that includes at least a semantic triple, the semantic triple including the input entity, the relation, and the output data; and
   using, via the virtual assistant, the semantic triple in a question-answering system.

10. The one or more non-transitory computer readable storage media of claim 9, further comprising:
    generating, via the machine learning system, a set of confidence scores for the set of candidates,
    wherein,
    the answer candidate is associated with a particular confidence score,
    the set of candidates include another candidate,
    the another candidate is associated with another confidence score, and
    the particular confidence score is less than the another confidence score.

* * * * *